Dec. 3, 1968    B. F. GILBREATH ET AL    3,414,778
SOLID STATE OVERLOAD CURRENT CONTROLLER
Filed Jan. 3, 1966    3 Sheets-Sheet 1

INVENTORS
*Benjamin F. Gilbreath*
*Donald L. Brown*
BY William E. Johnson, Jr.
ATTORNEY United States Patent Office 3,414,778
Patented Dec. 3, 1968

3,414,778
SOLID STATE OVERLOAD CURRENT CONTROLLER
Benjamin F. Gilbreath, Richardson, and Donald L. Brown, Dallas, Tex., assignors to Texas Instruments Incorporated, Dallas, Tex., a corporation of Delaware
Filed Jan. 3, 1966, Ser. No. 518,279
9 Claims. (Cl. 317—148.5)

ABSTRACT OF THE DISCLOSURE

Disclosed is an electrical circuit for controlling current flow. The control circuit activates a circuit breaker when the electrical current increases to a normal overload. The circuit breaker does not activate either at normal current levels or at very high current overloads, thus allowing current to flow. In the latter case the very high overload current allows a fuse to interrupt the current flow.

---

This invention relates to circuits for monitoring and controlling electrical current. More particularly it relates to circuits for detecting different levels of excessive electrical currents and providing means for either activating a circuit breaker or opening a fuse.

Protective devices are generally provided in electrical circuits to prevent damage to electrical equipment in the event of excessive current in the line. Fuses and circuit breakers are most often used for this purpose. In the conventional circuit using a fuse, the device is serially connected in the line and all the current in the circuit will pass through the fuse, the fuse being fabricated generally as a length of metal or wire which will melt due to the heat of the current and will interrupt the circuit. Since the circuit is interrupted, none of the damaging current will reach the electrical equipment sought to be protected. The fuse is desroyed each time a fault of sufficient duration occurs and must be replaced to restore current to the electrical equipment after the fault has been corrected.

Circuit breakers are another type of protective device for utilization in electrical circuits to prevent damage to equipment from excessive electrical current, wherein the breaker's control element senses the high current and opens the contactor. The breaker is normally undamaged when a fault occurs and can be reset to restore current to the line after the fault has been corrected. However, circuit breakers do have the disadvantage of being susceptible to damage themselves should the current through the contractors be so high as to cause arcing.

Many electrical circuits and equipment are capable of taking momentary faults without damage to the equipment, and most of the so-called heavy equipment draws a large amount of starting or surge current, so it is important that there be protective devices which have a built-in delay, as evidenced by the conventional fuses and circuit breakers which exhibit time delay characteristics before interrupting the circuit.

In the protectve circuitry for electrical equipment, especially those circuits handling several hundred amperes, circuit breakers will not handle the current without being destroyed or at least damaged by the arcing current, while fuses for such high amperage are generally quite expensive and nonetheless retain the disadvantages of fuses, i.e., they must be replaced after they are destroyed instead of being resettable as are circuit breakers.

It is therefore an object of the invention to provide a solid-state circuit which acts as a circuit breaker control at normal overload currents and acts as a control circuit for a fuse at excessively high overload currents.

It is another object of the invention to provide a solid state circuit which has a time delay, wherein said delay is a function of the magnitude of an overload current.

It is yet another object of the invention to provide a solid stat circuit for the detection of over current.

These and other objects, advantages and features of the invention will be evident to those skilled in the art from the following detailed description and drawings wherein.

The invention, in brief, comprises a circuit for detecting and controlling overload currents which would damage electrical equipment. The input to the circuit provides a sample of the overload condition, wherein the input is use dto drive a pair of Schmitt triggers. Trigger number one is on when its input is low and trigger number two is on when its input is high. Thus at normal levels of current, trigger number one is on and number two is off. When a normal overload occurs, number one is turned off (number two remains off), a capacitor begins to charge and eventually triggers an SCR through a detector which activates the circuit breaker solenoid to interrupt the line current to the electrical equipment. When a very high overload occurs, trigger number two turns on and saturates a transistor, the transistor preventing the capacitor from charging which would activate the breaker solenoid. A fuse, having a built-in delay, then operates to interrupt the line current and thus protect the equipment.

Figure 1:
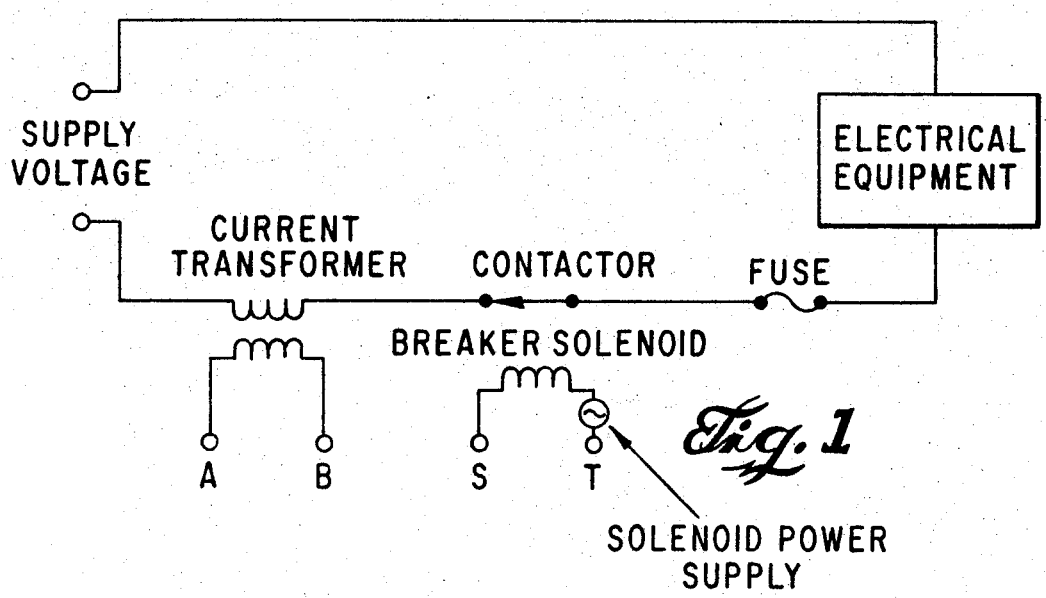
FIGURE 1 is a schematic diagram of a typical connection between the circuit according to the invention and the supply lines which lead to electrical equipment.

For a more detailed description, particularly with reference to FIGURE 1, there is illustrated a schematic representation of a typical connection between the circuit according to the invention and the supply lines which lead into the electrical equipment sought to be protected from an excess current. In the connection as illustrated, a conventional current transformer is placed in series with one of the supply lines to sample the line current, wherein points A and B are the same points as the points A and B shown in FIGURE 3. The circuit (illustrated in FIGURES 2 and 3) then will selectively control the breaker solenoid through points S and T or allow the fuse to interrupt the supply line if the current is so high as to possible damage the contactor points.

Figure 2:
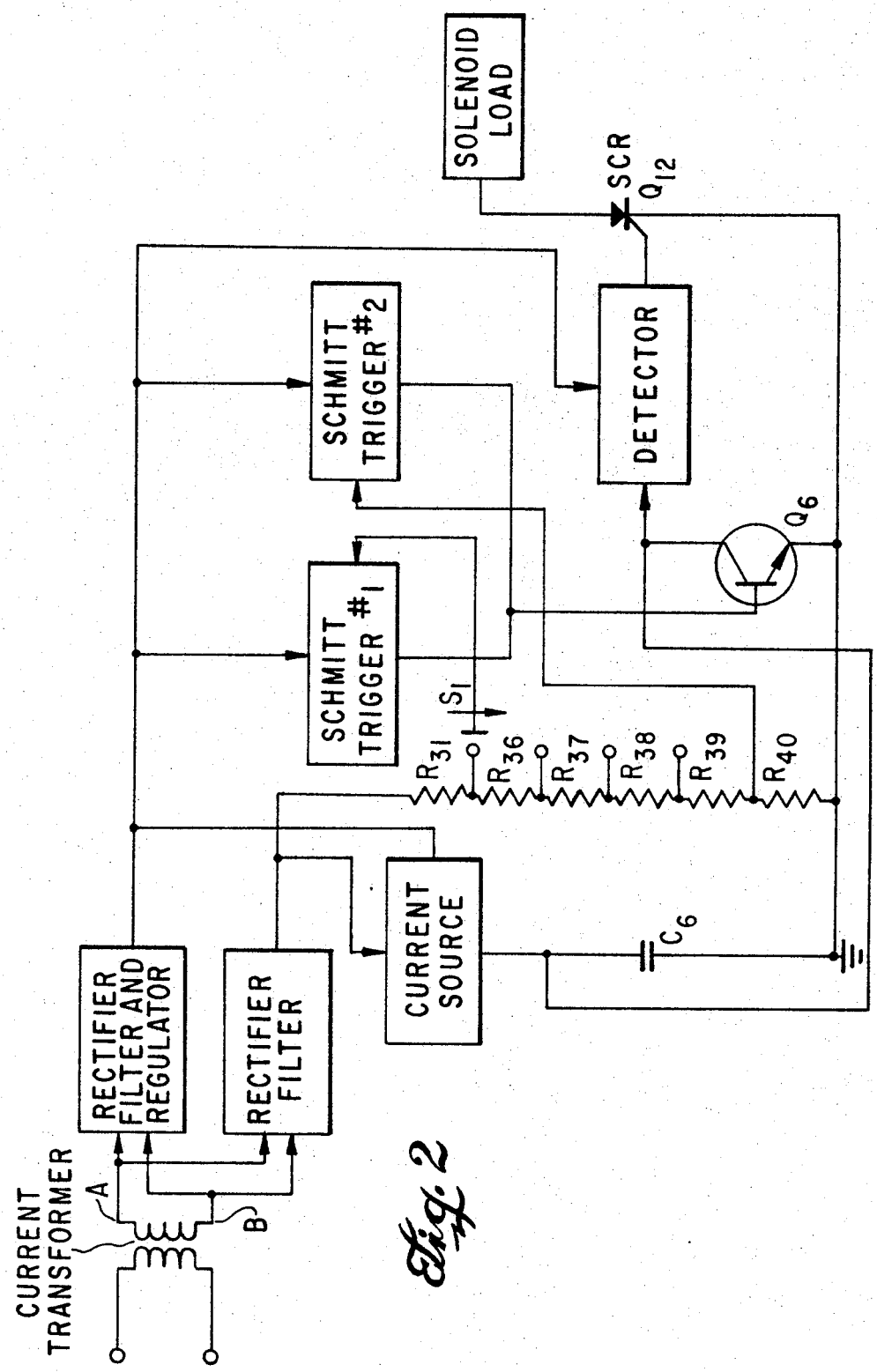
FIGURE 2 is a block diagram of the circuit according to the invention.
Figure 3:
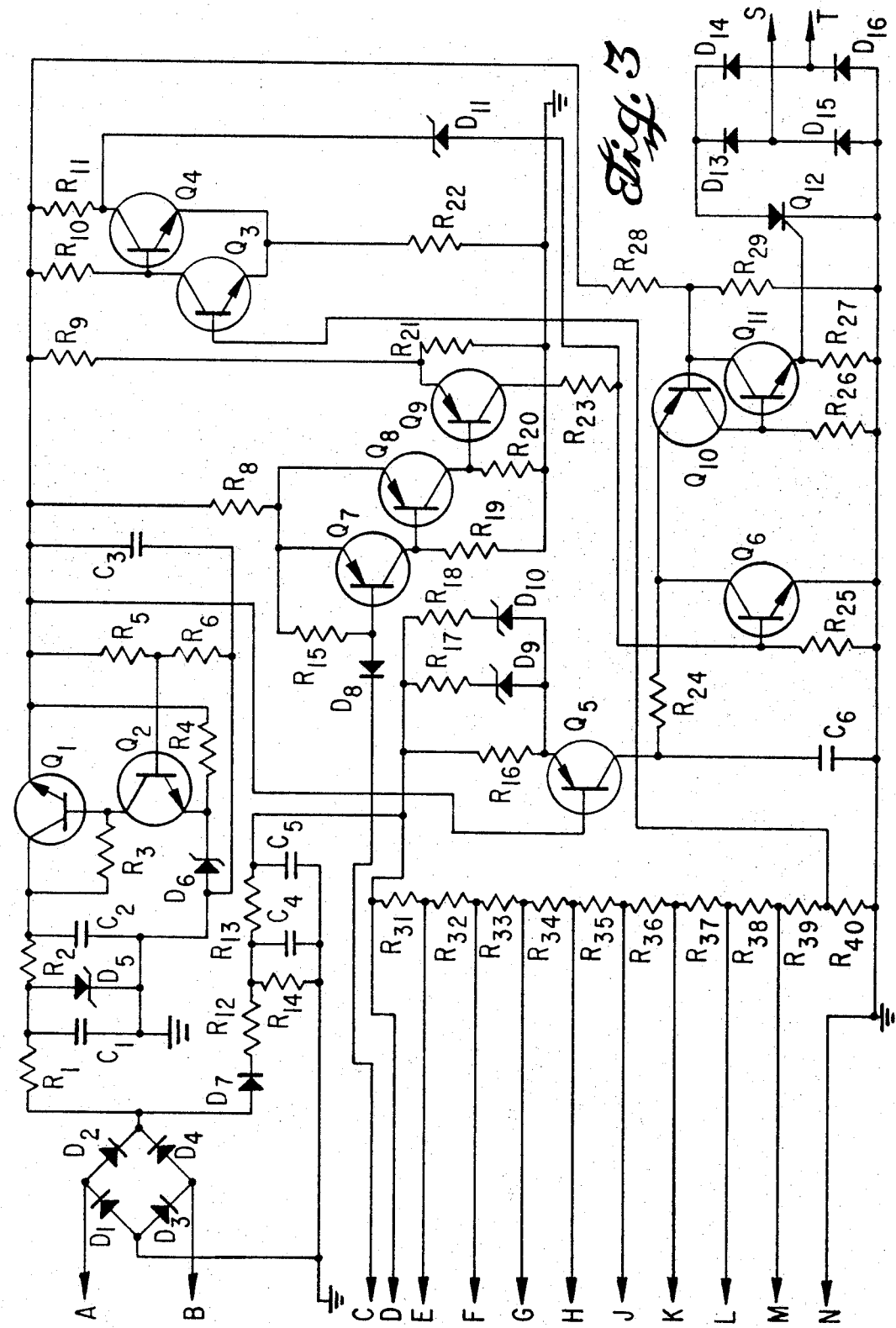
FIGURE 3 is a schematic diagram of the circuit according to the invention.

FIGURE 2 illustrates a block diagram of the circuit according to the invention. The input at points A and B from the current transformer delivers a voltage proportional to the line current. This input is rectified and filtered to provide a DC voltage which is proportional to the line current, wherein the DC voltage thus provided is the input to the detection and timing circuits. A second rectifier, filter, and regulator circuit is also driven from the input from the current transformer which provides a regulated DC voltage to act as the power supply to drive the detector and timer circuits. The DC voltage coming from the box labelled "Rectifier-Filter" is fed into a current source and a series string of precision resistors, whereby the current source feeds a current into the timing capacitor $C_6$ which is proportional to the input to the current source. The points between each of the resistors $R_{40}$, $R_{39}$, $R_{38}$, $R_{37}$, $R_{36}$, $R_{31}$ (FIGURE 3 illustrates $R_{31-40}$ but some have been omitted for simplicity in FIGURE 2) are voltage taps used as input levels to the level detectors (Schmitt triggers). A conventional transistor equivalent of a Schmitt trigger is described on page 6–55 (circuit 6–18) in Selected Semiconductor Circuits Handbook, edited by Seymour Schwartz, published in New York in 1960 by John Wiley and Sons, Incorporated. Schmitt trigger number one is only "on" (conducting)

when its input voltage is low, and Schmitt trigger number two is only "on" when its input voltage is high. If either trigger is on, the transistor $Q_6$ is driven into saturation. While the transistor $Q_6$ is saturated, it will conduct the current from the current source, thus by-passing the timing capacitor $C_6$.

Whenever the line current is low (at a normal level), the input to each of the Schmitt triggers is low; thus trigger number one will be on and trigger number two will be off. Therefore, transistor $Q_6$ is conducting, $C_6$ is by-passed (cannot charge up) and the detector circuit will not be activated. Whenever the line current has a normal overload conduction, the line voltage to the Schmitt triggers increases and at some predetermined point the trigger number one will turn off. Since trigger number two is already off, there will be no drive for transistor $Q_6$ and the current source will begin to charge the timing capacitor $C_6$. After a given time, the capacitor will fire the detector which applies a pulse to the SCR ($Q_{12}$). The SCR thereby conducts and applies power to the breaker solenoid, thus interrupting the supply line as illustrated in FIGURE 1.

The voltage taps that are used as the inputs to the two triggers are provided to cause the individual triggers to turn off or on at different voltage levels corresponding to different magnitudes of line current. Whenever the line current becomes so large as to possibly damage the breaker contacts, the voltage at trigger number two will turn it on and saturate transistor $Q_6$. At that particular level of line current and higher, $Q_6$ will always be on and prevent the detector from firing. Therefore, the breaker solenoid will not be activated and the fuse can serve to interrupt the supply line (illustrated in FIGURE 1). It is especially important with certain heavy electrical equipment, some of which draws several hundred amperes, that the fuse not be destroyed, because certain of the explosive-type fuses cost several hundreds of dollars apiece. Thus, the circuit breaker can be used for normal overload conditions and the more expensive fuse saved for the extreme overload.

The current source provides the timing functions for the control circuit according to the invention, the timing function being important because of the characteristic of electrical equipment which can tolerate a small over current much longer than it can a large over current. The current source (as illustrated in FIGURE 3) is comprised of a transistor $Q_5$ with its base biased at a constant voltage supplied from the regulated DC voltage. The emitter of $Q_5$ is connected through resistor $R_{16}$ back to the input voltage. The current from the current source is then approximately equal to the voltage across the resistor $R_{16}$ divided by the resistance of $R_{16}$. With $C_6$ driven by such a current, it should be appreciated that the time versus line current curve is a hyperbola or "$I \cdot t$" curve. By shunting the emitter resistor $R_{16}$ with a Zener diode $D_9$ and a resistor $R_{17}$ in series combination, the time versus current curve will trace one hyperbola until the diode goes into conduction and another hyperbola after the diode conducts. These two hyperbolas can be made to fit the ideal $I^2 t$ curve very closely. The preferred embodiment, as illustrated in FIGURE 3, also uses another shunting resistor $R_{18}$ and Zener diode $D_{10}$.

The block of FIGURE 2 labelled as "Rectifier-Filter and Regulator" is comprised of $D_1$, $D_2$, $D_3$ and $D_4$ in the rectifier portion. The filter portion is comprised of $R_1$, $C_1$, $R_2$, $D_5$ and $C_2$. The regulator portion is comprised of $R_3$, $Q_1$, $Q_2$, $D_6$, $R_4$, $R_5$ and $R_6$.

The block labelled as the "Rectifier-Filter" is comprised of $D_1$, $D_2$, $D_3$, and $D_4$ in the rectifier portion and $D_7$, $R_{12}$, $R_{14}$, $R_{13}$, $C_4$ and $C_5$ in the filter portion.

Schmitt trigger number one is comprised of transistors $Q_7$, $Q_8$ and $Q_9$, resistors $R_8$, $R_9$, $R_{15}$, $R_{19}$, $R_{20}$, $R_{21}$ and $R_{23}$, diode $D_8$.

Schmitt trigger number two is comprised of transistors $Q_3$ and $Q_4$, resistors $R_{10}$, $R_{11}$ and $R_{22}$ and diode $D_{11}$.

The detector block is comprised of transistors $Q_{10}$ and $Q_{11}$, and resistors $R_{24}$, $R_{26}$, $R_{27}$, $R_{28}$ and $R_{29}$.

Resistor $R_{25}$ is used to bias transistor $Q_6$.

Rectifiers $D_{13}$, $D_{14}$, $D_{15}$ and $D_{16}$ are used to allow the circuit to switch an AC load.

The following devices are examples of solid state components for utilization in the circuit according to the invention:

| | |
|---|---|
| $R_1$ | 500 ohms, 10 watts. |
| $R_2$ | 100 ohms. |
| $R_3$ | 1K ohm. |
| $R_4$ | 6.8K ohms. |
| $R_5$ | 3.09K ohms. |
| $R_6$ | 3.3K ohms. |
| $R_8$ | 4.32K ohms. |
| $R_9$ | 10K ohms. |
| $R_{10}$ | 10K ohms. |
| $R_{11}$ | 100K ohms. |
| $R_{12}$ | 1K ohm., 1 watt. |
| $R_{13}$ | 1K ohm., 1 watt. |
| $R_{14}$ | 12K ohms., 2 watts. |
| $R_{15}$ | 27K ohms. |
| $R_{16}$ | 93K ohms. |
| $R_{17}$ | 93K ohms. |
| $R_{18}$ | 147K ohms. |
| $R_{19}$ | 10.5K ohms. |
| $R_{20}$ | 56K ohms. |
| $R_{21}$ | 10K ohms. |
| $R_{22}$ | 3.4K ohms. |
| $R_{23}$ | 82K ohms |
| $R_{24}$ | 270 ohms. |
| $R_{25}$ | 27K ohms. |
| $R_{26}$ | 47K ohms. |
| $R_{27}$ | 130 ohms. |
| $R_{28}$ | 7.68K ohms. |
| $R_{29}$ | 10K ohms. |
| $R_{31}$ | 6.49K ohms. |
| $R_{32}$ | 845 ohms. |
| $R_{33}$ | 619 ohms. |
| $R_{34}$ | 487 ohms. |
| $R_{35}$ | 374 ohms. |
| $R_{36}$ | 294 ohms. |
| $R_{37}$ | 261 ohms. |
| $R_{38}$ | 232 ohms. |
| $R_{39}$ | 1.54K ohm. |
| $R_{40}$ | 806 ohms. |
| $D_1$ | 1N4005. |
| $D_2$ | 1N4005. |
| $D_3$ | 1N4005. |
| $D_4$ | 1N4005. |
| $D_5$ | 1N1821, 22 v. |
| $D_6$ | 1N754, 7 v. |
| $D_7$ | 1N4005. |
| $D_8$ | 1N4005. |
| $D_9$ | 1N970B. |
| $D_{10}$ | 1N759A. |
| $D_{11}$ | 1N756, 11 v. |
| $D_{13}$ | 1N4005. |
| $D_{14}$ | 1N4005. |
| $D_{15}$ | 1N4005. |
| $D_{16}$ | 1N4005. |
| $C_1$ | 56 µf., 20 v., tantalum. |
| $C_2$ | 56 µf., 20 v., tantalum. |
| $C_3$ | .1 µf., 20 v. |
| $C_4$ | 10 µf. |
| $C_5$ | 10 µf. |
| $C_6$ | 120 µf., 10 v., tantalum. |
| $Q_1$ | 2N697. |
| $Q_2$ | 2N3708. |
| $Q_3$ | 2N3708. |
| $Q_4$ | 2N3708. |
| $Q_5$ | 2N3702. |
| $Q_6$ | 2N3708. |
| $Q_7$ | 2N3702. |
| $Q_8$ | 2N3702. |

| | |
|---|---|
| $Q_9$ | 2N3702. |
| $Q_{10}$ | 2N2944. |
| $Q_{11}$ | 2N3708. |
| $Q_{12}$ | 2N1602 (SCR). |

The points designated as C, D, E, F, G, H, J, K, L, M, and N are available to the user of the circuit to control the input levels for firing the Schmitt triggers, and, as illustrated in FIGURE 2, could be controlled with a switch $S_1$. However, a smaller or larger number of resistance means could be used or other means can also be used to control the input levels to the triggers.

It should be appreciated by those skilled in the art that while the preferred embodiment has been described and illustrated as a circuit for controlling AC loads, the circuit is readily adaptable for controlling and interrupting direct current, and it is to be understood that various changes, substitutions and alterations can be made therein without departing from the spirit and scope of the invention as defined by the appended claims.

What is claimed is:
1. An electrical current controlling circuit comprising:
   (a) means for sampling current;
   (b) a first trigger means responsive to said current sampling means, said first trigger means being conductive when said sampling current is at a normal level and being nonconductive when said sampling current is at a normal overload and at a very high overload;
   (c) a second trigger means responsive to said current sampling means, said second trigger means being nonconductive when said sampling current is at a normal level and at said normal overload, and being conductive only when said sampling current is at said very high overload;
   (d) electrical storage means responsive to said first and said second trigger means;
   (e) an electrical current source responsive to said sampled current, whereby said source supplies current to said storage means when both said first and said second trigger means are nonconductive;
   (f) a semiconductor switching device shunted across said storage means, said switching device being conductive when one of said trigger means is conductive;
   (g) detector means responsive to said electrical storage means; and
   (h) circuit interrupter means responsive to said detector means, whereby said interrupter means is activated only when both said first and said second trigger means are nonconductive, thereby allowing said electrical storage means to charge to a high enough voltage to cause said detector means to activate said circuit interrupter means, said first and said second trigger means being nonconductive only when said sampling current is at a normal overload.

2. An electrical current controlling circuit comprising:
   (a) a first trigger means responsive to said electrical current, said first trigger means being conductive when said sampling current is at a normal level and being nonconductive when said sampling current is at a normal overload and at a very high overload;
   (b) a second trigger means responsive to said electrical current, said second trigger means being non-conductive when said electrical current is at a normal level and at said normal overload, and being conductive only when said electrical current is at said very high overload;
   (c) electrical storage means responsive to said first and said second trigger means;
   (d) an electrical current source responsive to said electrical current, whereby said source supplies current to said storage means when said first and said second trigger means are both nonconductive;
   (e) a semiconductor switching device shunted across said storage means, said switching device being conductive when one of said trigger means is conductive;
   (f) detector means responsive to said electrical storage means; and
   (g) circuit interrupter means responsive to said detector means, whereby said interrupter means is activated only when both said first and said second trigger means being nonconductive thereby allowing said electrical storage means to charge to a high enough voltage to cause said detector means to activate said circuit interrupter means, said first and said second trigger means being nonconductive only when said current is at a normal overload.

3. The circuit according to claim 1 wherein said first and second trigger means respectively comprise a first and second Schmitt trigger.

4. The circuit according to claim 3 wherein said electrical storage means comprises a capacitor.

5. The circuit according to claim 4 wherein said switching device comprises a transistor.

6. The circuit according to claim 5 wherein said interrupter means comprises a silicon controlled rectifier and a circuit breaker solenoid.

7. The circuit according to claim 6 wherein said current source comprises a transistor and a resistor in series connection with the emitter of said transistor.

8. The circuit according to claim 1 wherein said means for sampling current comprises a current transformer.

9. The circuit according to claim 7 wherein said transistor is so biased as to saturated and by-pass said capacitor whenever one of said triggers is in a state of conduction.

References Cited

UNITED STATES PATENTS

| | | | |
|---|---|---|---|
| 3,327,171 | 6/1967 | Lipnitz et al. | 317—36 |
| 3,334,272 | 8/1967 | Lipnitz | 317—36 |

LEE T. HIX, *Primary Examiner.*

R. V. LUPO, *Assistant Examiner.*